US009895967B2

(12) United States Patent
Akaboshi et al.

(10) Patent No.: US 9,895,967 B2
(45) Date of Patent: Feb. 20, 2018

(54) PIPING MEMBER FOR FUEL CELL AND FUEL CELL VEHICLE EQUIPPED THEREWITH

(71) Applicant: TOYOTA JIDOSHA KABUSHIKI KAISHA, Toyota-shi, Aichi-ken (JP)

(72) Inventors: Ryota Akaboshi, Toyota (JP); Yasuki Otake, Toyota (JP); Shunichi Shibasaki, Toyota (JP); Yasuhiko Ohashi, Toyota (JP); Shigeyuki Terada, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/021,807

(22) PCT Filed: Oct. 3, 2014

(86) PCT No.: PCT/JP2014/005065
§ 371 (c)(1),
(2) Date: Mar. 14, 2016

(87) PCT Pub. No.: WO2015/052905
PCT Pub. Date: Apr. 16, 2015

(65) Prior Publication Data
US 2016/0221433 A1     Aug. 4, 2016

(30) Foreign Application Priority Data
Oct. 7, 2013   (JP) .................................. 2013-210044

(51) Int. Cl.
*B60K 13/04*     (2006.01)
*B60R 16/08*     (2006.01)
(Continued)

(52) U.S. Cl.
CPC ................ *B60K 13/04* (2013.01); *B60K 1/04* (2013.01); *B60L 11/1883* (2013.01);
(Continued)

(58) Field of Classification Search
CPC ..... B60K 13/04; B60R 16/08; B60L 11/1883; B60L 11/1898; B60L 11/1896; H01M 8/04156; H01M 8/04179
See application file for complete search history.

(56) References Cited

U.S. PATENT DOCUMENTS 2,558,023 A * 6/1951 Walsh .................... B60K 13/04
126/271.1
3,685,615 A * 8/1972 Rutt ...................... F01N 13/082
181/232
(Continued)

FOREIGN PATENT DOCUMENTS

DE       42 02 232 C1    1/1992
DE       42 29 541 A1    3/1994
(Continued)

*Primary Examiner* — Frank B Vanaman
(74) *Attorney, Agent, or Firm* — Finnegan, Henderson, Farabow, Garrett & Dunner, LLP

(57) ABSTRACT

A piping member that is used for a moving body equipped with a fuel cell and that is configured to suppress potential troubles caused by drainage water of the fuel cell. A fuel cell vehicle includes an exhaust pipe that is a piping member configured to discharge drainage water and exhaust gas of a fuel cell. The exhaust pipe includes an extended portion, a curved portion and an opening end portion and is mounted such that the exhaust pipe opens downward on the rear side of the fuel cell vehicle. The exhaust pipe is configured such that an inner wall surface of a wall portion of the opening end portion located on the front side of the vehicle is inclined from the rear side toward the front side of the fuel
(Continued)

cell vehicle to be extended to an opening, in the state that the exhaust pipe is mounted to the fuel cell vehicle.

6 Claims, 11 Drawing Sheets

(51) Int. Cl.
 *B60K 1/04*    (2006.01)
 *H01M 8/04291*   (2016.01)
 *B60L 11/18*    (2006.01)
 *B60R 13/08*    (2006.01)
 *H01M 8/04119*   (2016.01)
 *H01M 8/0662*    (2016.01)
 *F01N 13/08*    (2010.01)

(52) U.S. Cl.
 CPC ....... *B60L 11/1888* (2013.01); *B60L 11/1896* (2013.01); *B60L 11/1898* (2013.01); *B60R 13/0876* (2013.01); *B60R 16/08* (2013.01); *H01M 8/04156* (2013.01); *H01M 8/04179* (2013.01); *H01M 8/04291* (2013.01); *B60L 2240/36* (2013.01); *B60Y 2200/90* (2013.01); *F01N 13/082* (2013.01); *H01M 8/0662* (2013.01); *H01M 2250/20* (2013.01); *Y02T 90/32* (2013.01); *Y02T 90/34* (2013.01)

(56) References Cited

U.S. PATENT DOCUMENTS

| | | | |
|---|---|---|---|
| 3,788,417 A | 1/1974 | Willis | |
| 3,833,305 A * | 9/1974 | Porter | G01N 21/15 250/573 |
| 3,952,823 A * | 4/1976 | Hinderks | F01N 13/082 180/164 |
| 4,137,879 A * | 2/1979 | Kageyama | F02M 19/086 123/568.17 |
| 4,279,223 A * | 7/1981 | Csonka | F02M 25/028 123/25 C |
| 4,402,714 A * | 9/1983 | Fethke | B01D 53/02 181/244 |
| 5,323,609 A | 6/1994 | Konrath et al. | |
| 2002/0060100 A1* | 5/2002 | Nagura | B60K 1/00 180/65.1 |
| 2002/0094469 A1 | 7/2002 | Yoshizumi et al. | |
| 2007/0000702 A1* | 1/2007 | Yoshida | B60K 1/00 429/442 |
| 2007/0007194 A1 | 1/2007 | Yoshida et al. | |
| 2007/0122669 A1* | 5/2007 | Kusano | B60L 11/1881 429/414 |
| 2009/0265934 A1 | 10/2009 | Lee et al. | |
| 2012/0138384 A1 | 6/2012 | Wakatsuki | |
| 2016/0221433 A1* | 8/2016 | Akaboshi | B60K 1/04 |

FOREIGN PATENT DOCUMENTS

| | | |
|---|---|---|
| DE | 102 62 172 B4 | 6/2008 |
| DE | 2009 005 180 T5 | 6/2008 |
| GB | 1058267 | 4/1964 |
| JP | 2009-26498 | 2/2009 |
| JP | 2009-135006 | 6/2009 |
| JP | 2012-91782 | 5/2012 |
| JP | 2012-91783 | 5/2012 |

* cited by examiner

PIPING MEMBER FOR FUEL CELL AND FUEL CELL VEHICLE EQUIPPED THEREWITH

CROSS-REFERENCE TO RELATED APPLICATIONS

This application is a national phase application of International Application No. PCT/JP2014/005065, filed Oct. 3, 2014, and claims the priority of Japanese Application No. 2013-210044, filed Oct. 7, 2013, the content of both of which is incorporated herein by reference.

TECHNICAL FIELD

The present invention relates to a piping member for fuel cell and a fuel cell vehicle equipped therewith.

BACKGROUND ART

In a polymer electrolyte fuel cell, hereinafter simply called "fuel cell", a large volume of water is generally generated during power generation. A fuel cell vehicle equipped with the fuel cell as a driving power source accordingly has a drainage piping to discharge drainage water from the fuel cell to outside of the vehicle.

For example, Patent Literature 1 (JP 2012-91782A) and Patent Literature 2 (JP 2012-91783A) disclose configurations of a drainage piping to suppress the drainage water from the fuel cell vehicle from splashing to the following vehicles by the driving wind. Patent Literature 3 (JP 2009-135006A) discloses a configuration employed in a vehicle that discharges the produced water of a fuel cell in the form of mist to change the direction of water drainage according to the state of its own vehicle and the states of the following vehicles.

SUMMARY

Technical Problem

The fuel cell vehicle discharges drainage water that is produced by idling of the fuel cell and a purge process, even when the vehicle is at stop. A puddle or water splash caused by the drainage water during stop of the fuel cell vehicle is likely to make a passenger leaving the vehicle or any person around the vehicle feel uncomfortable. In a low temperature environment, the water content discharged in the form of vapor together with drainage water is likely to be accumulated on brake pads of the fuel cell vehicle and freeze the brake pads.

The techniques disclosed in Patent Literatures 1 and 2 positively use the flow of the air such as driving wind to effectively suppress splashes of drainage water during a run of the fuel cell vehicle. The technique disclosed in Patent Literature 3, on the other hand, adequately controls the pressure of drainage water and the direction of water drainage to effectively suppress water from splashing on the following vehicles. Patent Literatures 1 to 3, however, aim to suppress the splashes of drainage water during a run of the fuel cell vehicle and have not specifically taken into account potential troubles caused by drainage water or vapor during stop of the fuel cell vehicle.

There is accordingly still a room for improvement with regard to the piping for drainage water of the fuel cell in the fuel cell vehicle. With regard to the prior art fuel cell vehicle, other needs include improvement of the water drainage efficiency, noise reduction during water drainage, downsizing, weight reduction, simplified configuration, cost reduction, resource saving and easy manufacture of the drainage piping and the improvement of usability. The improvement of the piping for drainage water of the fuel cell is not limited to the fuel cell vehicle but is a common problem with regard to moving bodies equipped with a fuel cell.

Solution to Problem

In order to solve at least part of the above problems, the invention may be implemented by any of the following aspects.

(1) According to one aspect of the invention, there is provided a piping member that is mounted to a moving body equipped with a fuel cell and is configured to discharge exhaust gas and drainage water of the fuel cell. The piping member may comprise an opening end portion and a curved pipe portion. The opening end portion may be configured to have an opening and may be arranged such that the opening opens downward of the moving body. The curved pipe portion may be curved toward the opening end portion and may be placed on the moving body such that an upstream side thereof is located on a center side in a longitudinal direction or in a lateral direction of the moving body. An inner wall surface on a curve inner circumference of the curved pipe portion out of an inner wall surface of the opening end portion may be inclined downward in a direction toward the upstream side of the curved pipe portion. The piping member of this aspect causes the drainage water flowing from the curved pipe portion to the opening end portion to be guided along the inner wall surface on the curve inner circumference of the curved pipe portion in a direction toward the center of the moving body. This configuration suppresses splashes of the drainage water around the moving body. This configuration also causes the exhaust gas to flow along the inner wall surface toward the center side of the moving body. A puddle formed by the drainage water is thus guided toward the center side of the moving body by this flow of the exhaust gas. This suppresses the puddle from being spread out of an underneath area of the moving body. The arrangement of the piping member mounted to the moving body defined in this aspect is required at least in the course of water drainage during stop of the moving body and a different arrangement may be provided in other time.

(2) in the piping member of the above aspect, the opening end portion may be placed on a rear side of a center in the longitudinal direction of the moving body. The curved pipe portion may be placed on the moving body such that the upstream side thereof is located on the center side in the longitudinal direction of the moving body. The inner wall surface on the curve inner circumference of the curved pipe portion out of the inner wall surface of the opening end portion may be inclined downward in a direction from a rear side toward a front side of the moving body. The piping member of this aspect suppresses the drainage water from splashing rearward of the moving body. This configuration also suppresses a puddle of the drainage water from being guided rearward from an underneath area of the moving body.

(3) The piping member of the above aspect may include a second inner wall surface that is an inner wall surface of the opening end portion located on the rear side of the moving body, in addition to a first inner wall surface that is the inner wall surface on the curve inner circumference of the curved pipe portion and is located on the front side of the moving body out of the inner wall surface of the opening end portion. The second inner wall surface may be inclined downward from the front side toward the rear side of the moving body. The piping member of this aspect causes the vapor discharged together with the drainage water to be guided along the second inner wall surface rearward of the moving body. This suppresses the vapor from being accumulated on a site ahead of the piping member.

(4) The piping member of the above aspect may include a second inner wall surface that is inclined downward in the direction from the rear side toward the front side of the moving body, instead of the above second inner wall surface. The piping member of this aspect unifies the flow of the exhaust gas to the direction toward the front side of the vehicle and thus more effectively causes a puddle formed by the drainage water to be guided forward of the moving body.

(5) In the piping member of the above aspect, the opening end portion may have an opening end face in which the opening is formed, and the opening end face may be inclined rearward of the moving body in a state that the piping member is mounted to the moving body. The piping member of this aspect suppresses a rear side of the opening end portion of the piping member from interfering with the ground underneath the moving body.

(6) According to another aspect of the invention, there is provided a fuel cell vehicle. The fuel cell vehicle may comprise a fuel cell and a piping member according to any of the above aspects. The moving body may be the fuel cell vehicle. This configuration also guides a puddle of the drainage water formed below the vehicle to a location deep on the center side of the vehicle.

The invention may be implemented by various aspects other than the piping member. For example, the invention may be implemented by aspects of a moving body equipped with a fuel cell other than the fuel cell vehicle or a stationary fuel cell system. The invention may also be implemented by aspects of a method of manufacturing the piping member, an apparatus for manufacturing the piping member, programs configured to implement the apparatus and the method and storage medium in which such programs are stored.

DESCRIPTION OF EMBODIMENTS

A. First Embodiment

Figure 1:
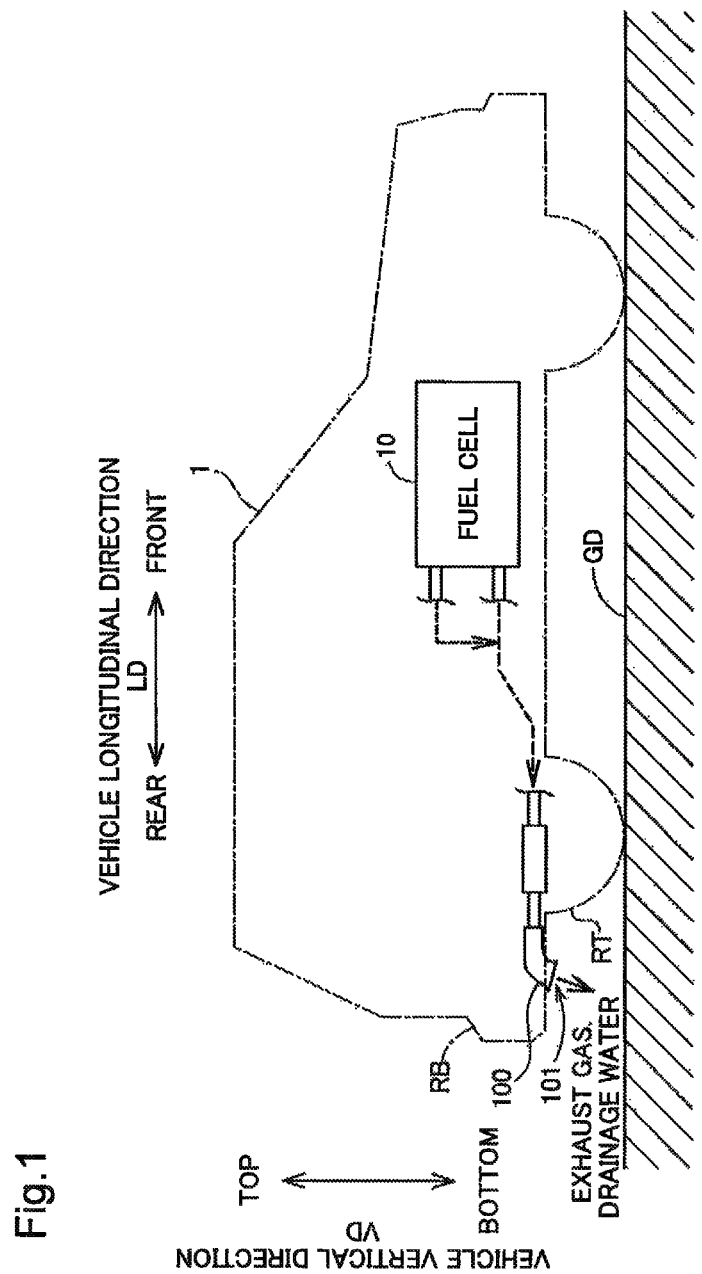
FIG. 1 is a schematic diagram illustrating the configuration of a fuel cell vehicle.

FIG. 1 is a schematic diagram illustrating the configuration of a fuel cell vehicle 1 according to a first embodiment of the invention. FIG. 1 illustrates the outline of the fuel cell vehicle 1 placed on a horizontal ground GD by the one-dot chain line. FIG. 1 also illustrates an arrow LD indicating a longitudinal direction of the fuel cell vehicle 1, hereinafter also called "vehicle longitudinal direction", and an arrow VD indicating a vertical direction of the fuel cell vehicle 1, hereinafter also called "vehicle vertical direction". The vehicle longitudinal direction and the vehicle vertical direction are orthogonal to each other. In the state that the fuel cell vehicle 1 is placed on a horizontal plane, the vehicle longitudinal direction is parallel to the horizontal plane, and the vehicle vertical direction is parallel to the direction of gravity. The arrow LD indicating the vehicle longitudinal direction and the arrow VD indicating the vehicle vertical direction are also illustrated as appropriate in drawings other than FIG. 1.

The fuel cell vehicle 1 includes a fuel cell 10 and an exhaust pipe 100. The fuel cell 10 is provided as a polymer electrolyte fuel cell that receives supplies of hydrogen and oxygen as reactive gases and generates electric power. The fuel cell vehicle 1 is driven with the electric power generated by the fuel cell 10. The fuel cell vehicle 1 is configured such that both drainage water on an anode side of the fuel cell 10 and drainage water on a cathode side of the fuel cell 10 are discharged with exhaust gas through a common piping. The details of the piping configuration of a fuel cell system in the fuel cell vehicle 1 will be described later.

The exhaust pipe 100 corresponds to a tail pipe and is a piping member attached to a downstream end of piping for discharging the drainage water and the exhaust gas of the fuel cell 10 described above. The exhaust pipe 100 is mounted to the fuel cell vehicle 1 such as to be open to the ground GD and is configured to discharge the exhaust gas and the drainage water of the fuel cell 10 toward the ground GD. In the fuel cell vehicle 1 of this embodiment, the exhaust pipe 100 is mounted such that its opening 101 is exposed to outside from a bottom face of a rear bumper RB located behind rear wheels RT.

Mounting the exhaust pipe 100 on the rear side of the fuel cell vehicle 1 ensures a space for providing a piping configuration for reducing the turbulence of the exhaust gas and the noise. According to this embodiment, the mounting position of the exhaust pipe 100 is not specifically limited in the vehicle width direction of the fuel cell vehicle 1. The exhaust pipe 100 may be mounted in a location close to either one of side faces of the fuel cell vehicle 1 or may be mounted at a center in the vehicle width direction of the fuel cell vehicle 1.

The exhaust pipe 100 of the embodiment is configured such as to guide the drainage water forward of the fuel cell vehicle 1 and guide the vapor that is discharged with the drainage water, rearward of the fuel cell vehicle 1. This configuration suppresses a potential trouble caused by the drainage water and the vapor discharged from the exhaust pipe 100 while the fuel cell vehicle 1 is at stop. The following describes this configuration more specifically.

Figure 2:
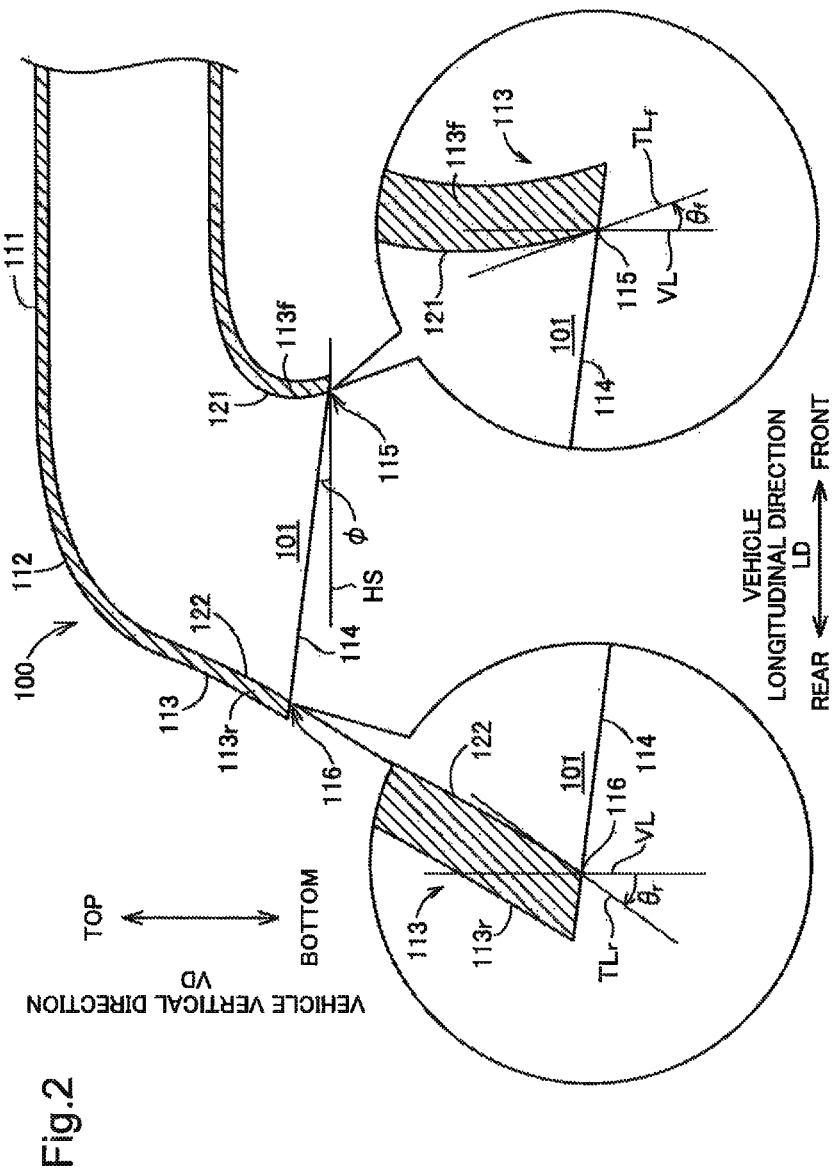
FIG. 2 is a schematic sectional view illustrating the configuration of an exhaust pipe.

FIG. 2 is a schematic sectional view illustrating the configuration of the exhaust pipe 100. FIG. 2 illustrates the schematic section of the exhaust pipe 100 taken on a plane that goes through the center of the opening 101 of the exhaust pipe 100 and is parallel to the extending direction of an extended portion 111. The exhaust pipe 100 is a piping member in a curved, approximately cylindrical shape and includes the extended portion 111, a curved portion 112 and an opening end portion 113. The extended portion 111 is a region extended approximately linearly.

The curved portion 112 is a curved region located downstream of the extended portion 111 and corresponds to the curved pipe portion. The opening end portion 113 is an end region located downstream of the curved portion 112 and has the opening 101. The exhaust pipe 100 is mounted to the fuel cell vehicle 1 such that the extended portion 111 is parallel to the vehicle longitudinal direction and the curved portion 112 is curved downward.

The opening end portion 113 has a wall portion that is formed around the opening 101 such that its end face is flush. In the description below, a plane defined by the end face of the wall portion around the opening 101 is called "opening end face 114". According to a preferable configuration, the opening end face 114 is inclined, at an angle φ ($\varphi$>0°) relative to a plane HS that is parallel to the vehicle longitudinal direction and is orthogonal to the vehicle vertical direction. This configuration suppresses a rear end of the exhaust pipe 100 from interfering with the ground, for example, when the fuel cell vehicle 1 enters a steep upward slope.

Additionally, in the opening end portion 113, at least a first wall portion 113$f$ on the curve inner circumference located on the front side of the fuel cell vehicle 1 and a second wall portion 113$r$ on the curve outer circumference located on the rear side of the fuel cell vehicle 1 are formed to increase the distance therebetween downward. More specifically, in the opening end portion 113, the first wall portion 113$f$ is curved toward the extended portion 111 (toward the upstream side of the curved portion 112), i.e., curved to be convex rearward, while the second wall portion 113$r$ is curved in the reverse direction, i.e., curved to be convex forward. The entire wall portion of the opening end portion 113 is curved to increase the opening diameter downward.

In the state that the exhaust pipe 100 is mounted to the fuel cell vehicle 1, an inner wall surface 121 of the first wall portion 113$f$ is inclined from the front side toward the rear side of the vehicle, and an inner wall surface 122 of the second wall portion 113$r$ is inclined from the rear side toward the front side of the vehicle. More specifically, in the section of FIG. 2, a tangent $TL_f$ at an end 115 of the inner wall surface 121 of the first wall portion 113$f$ has an angle of inclination $\theta_f$ ($\theta_f$>0°) forward of the vehicle relative to a straight line VL parallel to the vehicle vertical direction. In the section of FIG. 2, a tangent $TL_r$, at an end 116 of the inner wall surface 122 of the second wall portion 113$r$ has an angle of inclination $\theta_r$ ($\theta_r$>0°) rearward of the vehicle relative to the straight line VL parallel to the vehicle vertical direction.

Figure 3:
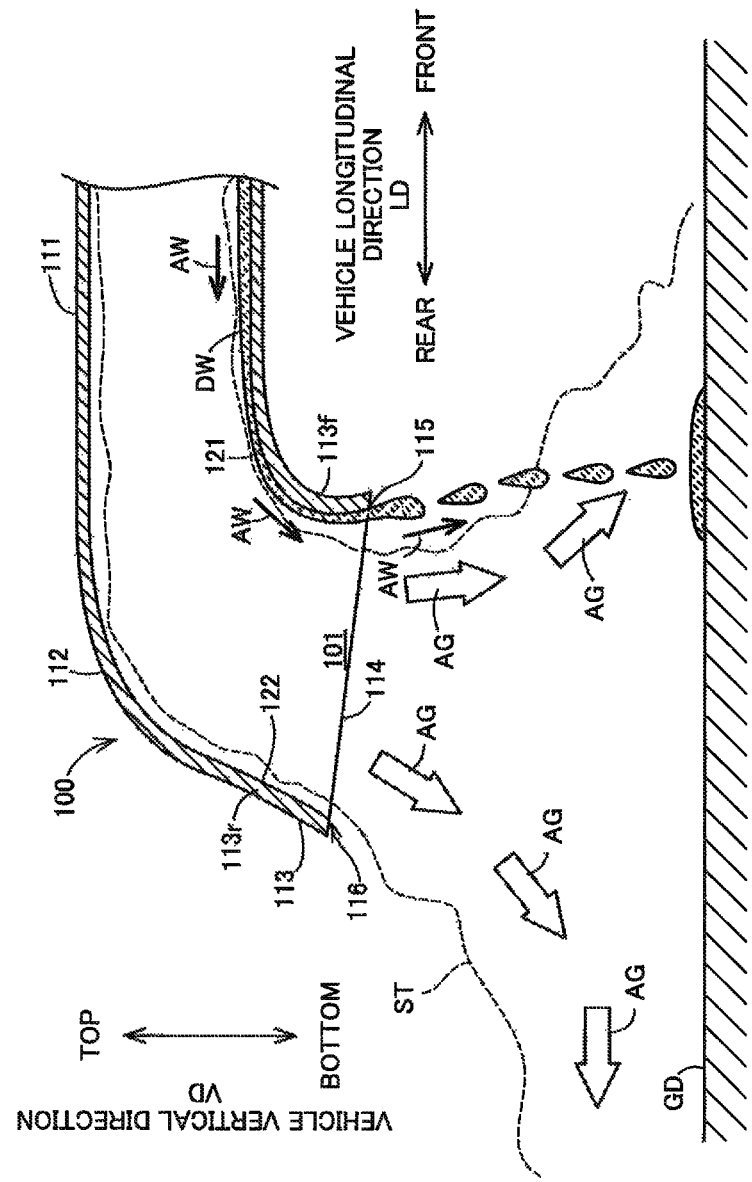
FIG. 3 is a diagram illustrating the state of drainage water and vapor discharged from the exhaust pipe.

FIG. 3 is a diagram illustrating the state of drainage water DW and vapor ST discharged from the exhaust pipe 100 when the fuel cell vehicle 1 is at stop. FIG. 3 schematically illustrates the section of the exhaust pipe 100 mounted to the fuel cell vehicle 1 like FIG. 2 and also schematically illustrates the drainage water DW and the vapor ST flowing out of the exhaust pipe 100. FIG. 3 also illustrates arrows AW indicating the flow direction of the drainage water DW and arrows AG indicating the flow direction of the exhaust gas, in addition to the arrow VD indicating the vehicle vertical direction and the arrow LD indicating the vehicle longitudinal direction.

As described above, in the exhaust pipe 100, the inner wall surface 121 of the first wall portion 113$f$ on the curve inner circumference of the opening end portion 113 is curved forward of the fuel cell vehicle 1. The drainage water from the fuel cell 10 flows along the inner wall surface 121 and flows down from the exhaust pipe 100, due to its viscous force. The inertial force away from the exhaust pipe 100 causes the drainage water to flow down toward a location on the front side of the vehicle that is closer to the center of the vehicle. In the case where a large volume of the exhaust gas flows out, for example, during a purge process described later, the drainage water is affected by the exhaust gas flowing along the inner wall surface 121 and further flows down toward the location on the front side of the vehicle. This configuration suppresses the drainage water from splashing rearward of the vehicle when the fuel cell vehicle 1 is at stop, thus protecting people and objects located behind the fuel cell vehicle 1 at stop from splashes of the drainage water of the fuel cell 10.

In the exhaust pipe 100, the inner wall surface 122 of the second wall portion 113$r$ on the curve outer circumference is curved rearward of the fuel cell vehicle 1. This configuration causes a large part of the exhaust gas discharged from the exhaust pipe 100 to flow along the inner wall surface 121 of the first wall portion 113$f$ on the curve inner circumference. More specifically, in the exhaust pipe 100 of the embodiment, the opening end face 114 is inclined rearward of the vehicle, so that a larger part of the exhaust gas flows along the inner wall surface 121 of the first wall portion 113$f$ on the curve inner circumference. This flow of the exhaust gas guides a most part of the vapor ST discharged from the exhaust pipe 100 rearward of the vehicle and suppresses the vapor ST from being accumulated on brake pads of the rear wheels RT of the fuel cell vehicle 1 located ahead of the exhaust pipe 100. This accordingly suppresses the brake pads from being frozen by the accumulated vapor ST in low temperature environment.

Figure 4:
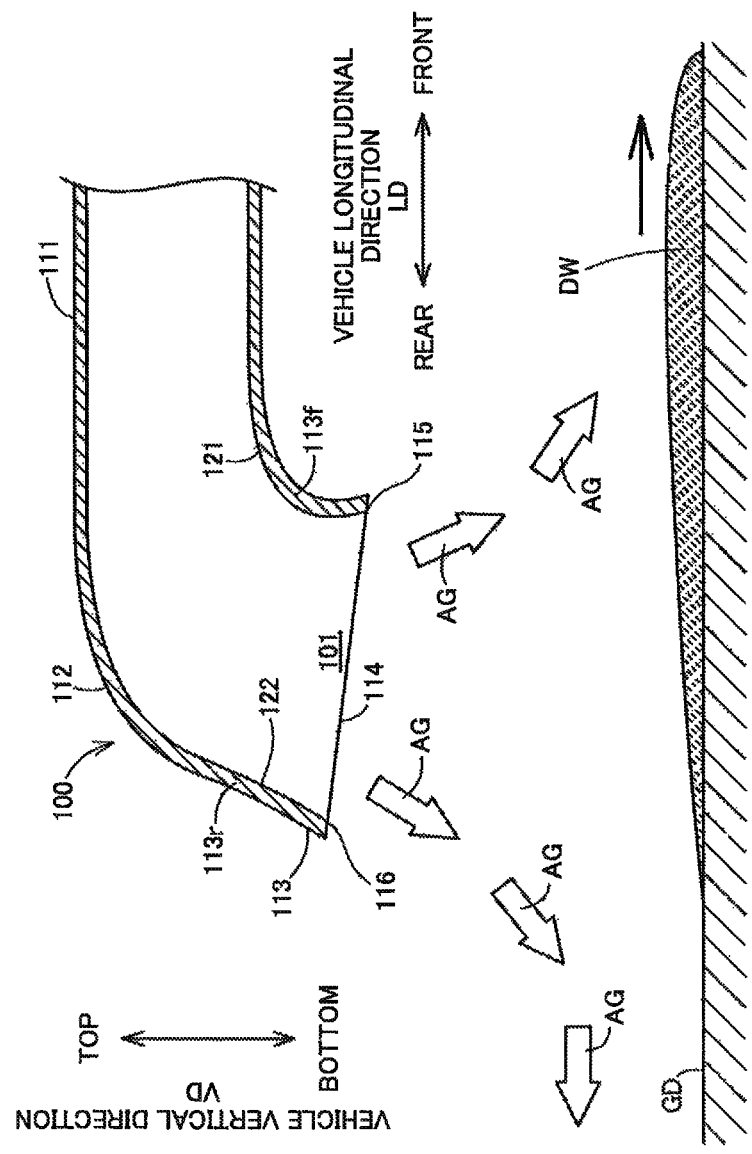
FIG. 4 is a diagram illustrating the behavior of a puddle formed by the drainage water discharged from the exhaust pipe.

FIG. 4 is a diagram illustrating the behavior of a puddle formed by the drainage water DW discharged from the exhaust pipe 100. FIG. 4 schematically illustrates the section of the exhaust pipe 100 mounted to the fuel cell vehicle 1 like FIG. 3 and also illustrates a puddle formed on the ground GD by the drainage water DW discharged from the exhaust pipe 100. FIG. 4 also illustrates arrows the arrows AG indicating the flow direction of the exhaust gas, in addition to the arrow VD indicating the vehicle vertical direction and the arrow LD indicating the vehicle longitudinal direction, like FIG. 3.

With regard to the fuel cell vehicle 1 of the embodiment, as shown in FIG. 3, the puddle by the drainage water DW discharged from the exhaust pipe 100 is formed below the first wall portion 113$f$ of the exhaust pipe 100. As shown in FIG. 4, the puddle is guided toward the center of the vehicle by the flow of the exhaust gas along the inner wall surface 121 of the first wall portion 113$f$. This suppresses the puddle of the drainage water DW from being spread out of the underneath of the fuel cell vehicle 1 and thereby suppresses the puddle of the drainage water DW from coming into the field of vision of a passenger leaving the fuel cell vehicle 1 or of any person behind the fuel cell vehicle 1. This accordingly suppresses any such person from feeling uncomfortable due to the puddle.

Figure 5:
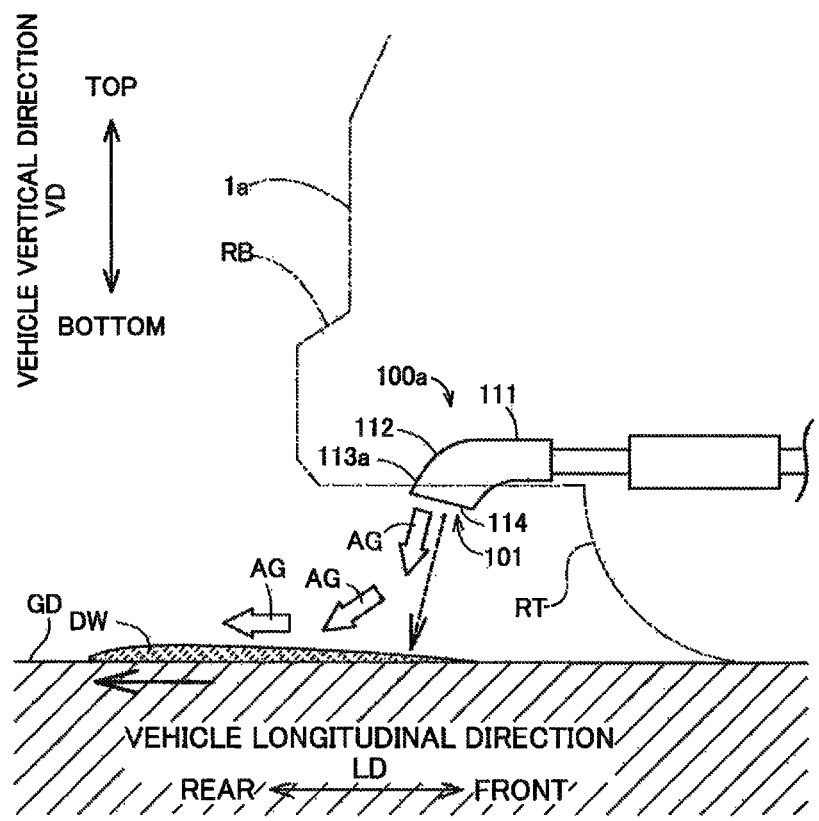
FIG. 5 is a schematic diagram illustrating the configuration of a fuel cell vehicle according to a comparative example.

FIG. 5 is a schematic diagram illustrating the configuration of a fuel cell vehicle 1a according to a comparative example. FIG. 5 illustrates the outline on the rear side of the fuel cell vehicle 1a of the comparative example by the one-dot chain line and an exhaust pipe 100a of the comparative example by the solid line. The fuel cell vehicle 1a of the comparative example has substantially similar configuration to that of the fuel cell vehicle 1 of the embodiment, except that the fuel cell vehicle 1a has the exhaust pipe 100a of the comparative example. The configuration of the exhaust pipe 100a of the comparative example is substantially similar to the configuration of the exhaust pipe 100 of the embodiment, except that a wall portion of its opening end portion 113a is linearly extended to have approximately equal opening diameter.

In the fuel cell vehicle 1a of the comparative example, as shown by the broken line arrow, the drainage water DW of the fuel cell 10 is discharged along the extending direction of the wall portion forming the opening end portion 113a of the exhaust pipe 100a. The fuel cell vehicle 1a of the comparative example is thus more likely to splash the drainage water DW, rearward of the vehicle. In the case where a large volume of the exhaust gas is discharged after formation of a puddle by the drainage water DW, for example, by a purge process described later, the exhaust gas is likely to guide the puddle rearward of the vehicle and spread the puddle out of the underneath of the fuel cell vehicle 1a. This increases the likelihood that a passenger leaving the fuel cell vehicle 1a or any person behind the fuel cell vehicle 1a feels uncomfortable due to the puddle of the drainage water DW.

Figure 6:
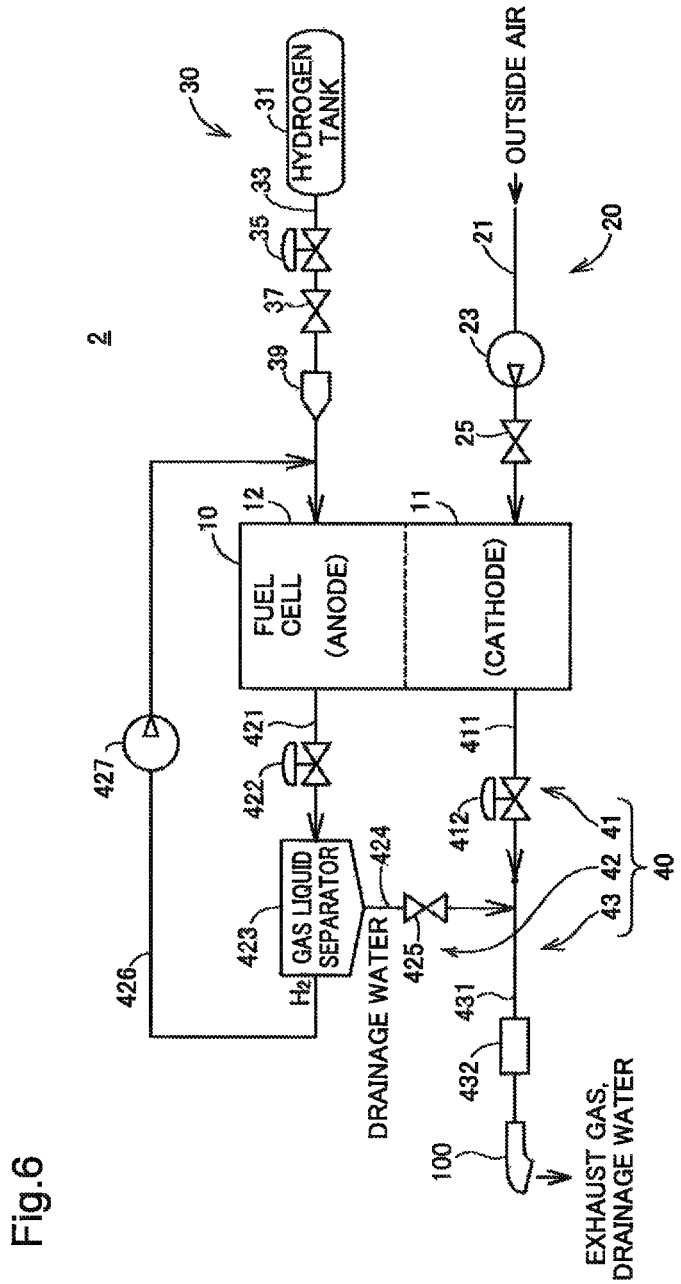
FIG. 6 is a schematic diagram illustrating one example of the configuration of a fuel cell system that is mounted on the fuel cell vehicle and uses the exhaust pipe.

FIG. 6 is a schematic diagram illustrating one example of the configuration of a fuel cell system 2 that is mounted on the fuel cell vehicle 1 and uses the exhaust pipe 100 described above. The fuel cell system 2 is configured to supply and discharge the reactive gases to and from the fuel cell 10. The fuel cell system 2 includes the fuel cell 10 described above, a cathode gas supply system 20, an anode gas supply system 30 and an exhaust drainage treatment system 40. The respective components 20, 30 and 40 of the fuel cell system 2 are controlled by a controller, which is not shown in the figures, mounted on the fuel cell vehicle 1. The controller is implemented by a microcomputer including a main storage unit and a central processing unit.

The cathode gas supply system 20 takes in the outside air and supplies the intake air as cathode gas to a cathode 11 of the fuel cell 10 via a cathode gas piping 21. The cathode gas piping 21 is provided with an air compressor 23 and an on-off valve 25 in this sequence from the upstream. The air compressor 23 serves to take in the outside air, compress the intake air to a predetermined pressure and feed the compressed air to the downstream, in response to instructions from the controller. The on-off valve 25 serves to control the cathode gas flowing into and out of the cathode 11. The on-off valve 25 is normally closed and is opened when the cathode gas of the predetermined pressure flows in from the upstream.

The anode gas supply system 30 supplies high-pressure hydrogen filled in a hydrogen tank 31 as anode gas to an anode 12 of the fuel cell 10 via an anode gas piping 33. The anode gas piping 33 is provided with a regulator 35, an on-off valve 37 and a hydrogen supply device 39 in this sequence from the upstream. The regulator 35 and the on-off valve 37 serve to control the pressure of hydrogen upstream of the hydrogen supply device 39. The hydrogen supply device 39 is implemented by for example, an injector and serves to supply hydrogen of a flow rate specified by an instruction of the controller to the anode 12.

The exhaust drainage treatment system 40 discharges the exhaust gas and the drainage water from the cathode 11 of the fuel cell 10 to outside of the fuel cell vehicle 1, while recirculating the exhaust gas from the anode 12 to the anode 12 and discharging the drainage water from the anode 12 to the outside. The exhaust drainage treatment system 40 includes a cathode system 41, an anode system 42 and a joint discharge portion 43.

The cathode system 41 includes a cathode off gas pipe 411 and a pressure regulator 412. The cathode off gas pipe 411 is arranged to connect the outlet of the cathode 11 of the fuel cell 10 with a junction pipe 431 of the joint discharge portion 43 and flow the drainage water and the exhaust gas on the cathode 11-side into the junction pipe 431 of the joint discharge portion 43. The pressure regulator 412 is placed in the vicinity of the outlet of the cathode 11 in the cathode off gas pipe 411 and is used to adjust the back pressure of the cathode 11.

The anode system 42 includes an anode off gas pipe 421, a pressure regulator 422, a gas liquid separator 423, a drainage pipe 424, a drainage valve 425, a hydrogen circulation pipe 426 and a hydrogen circulation pump 427. The anode off gas pipe 421 is arranged to connect the outlet of the anode 12 of the fuel cell 10 with the inlet of the gas liquid separator 423. The pressure regulator 422 is placed in the vicinity of the outlet of the anode 12 in the anode off gas pipe 421 and is used to adjust the back pressure of the anode 12.

The gas liquid separator 423 separates the gas, i.e., hydrogen and the water content included in an anode off gas from each other and guides the gas to the hydrogen circulation pipe 426 while guiding the water content to the drainage pipe 424. The hydrogen circulation pipe 426 is connected with the anode gas piping 33 of the anode gas supply system 30. The hydrogen circulation pump 427 is placed in the middle of the hydrogen circulation pipe 426. The hydrogen separated by the gas liquid separator 423 is fed through the hydrogen circulation pipe 426 to the anode gas piping 33 of the anode gas supply system 30 by the driving force of the hydrogen circulation pump 427.

The drainage pipe 424 is connected, along with the cathode off gas pipe 411 of the cathode system 41, to the junction pipe 431 of the joint discharge portion 43 and is arranged to flow the drainage water on the anode 12-side separated by the gas liquid separator 423 into the junction pipe 431 of the joint discharge portion 43. The drainage valve 425 is placed in the drainage pipe 424 and is controlled by the controller to open at a predetermined drainage timing.

The joint discharge portion 43 includes the junction pipe 431, a muffler 432 and the exhaust pipe 100. The junction pipe 431 is connected with the cathode off gas pipe 411 of the cathode system 41 and with the anode off gas pipe 424 of the anode system 42 as described above. This configuration causes the drainage water on the cathode 11-side, the cathode off gas and the drainage water on the anode 12-side to flow into the junction pipe 431.

The muffler 432 is provided in the middle of the junction pipe 431 and serves to reduce the turbulence and noise caused by the flow of exhaust gas in the junction pipe 431 and the exhaust pipe 100. The exhaust pipe 100 is mounted to a downstream end of the junction pipe 431 and is arranged to discharge the drainage water and the exhaust gas out of the fuel cell vehicle 1 as described above.

The fuel cell system 2 performs a purge process in the fuel cell 10 when the fuel cell vehicle 1 is at stop. In the state that the supply of hydrogen from the hydrogen tank 31 is stopped, the purge process drives the hydrogen circulation pump 427 to circulate the gas on the anode 12 of the fuel cell 10 through the hydrogen circulation pipe 426, while discharging the drainage water via the gas liquid separator 423 to the junction pipe 431. The purge process also uses the compressed air generated by the air compressor 23 to discharge the drainage water on the cathode 11-side to the junction pipe 431.

In the purge process, after a large volume of drainage water is discharged at a time from the exhaust pipe 100 in its initial stage, the purge gas is discharged as the exhaust gas from the exhaust pipe 100 for a while, for example about ten to several ten seconds. In the purge process, it is likely to form a puddle by the drainage water DW below the fuel cell vehicle 1. The exhaust pipe 100 of this embodiment is configured to guide the puddle toward the center of the vehicle below the fuel cell vehicle 1 as described with reference to FIG. 4. This suppresses the potential troubles caused by the puddle of the drainage water DW in the purge process.

As described above, the exhaust pipe 100 of this embodiment is configured to guide the drainage water of the fuel cell 10 forward from the rear end portion of the fuel cell vehicle 1 and guide the vapor discharged together with the drainage water rearward of the fuel cell vehicle 1. The configuration of the fuel cell vehicle 1 of the embodiment including the exhaust pipe 100 accordingly suppresses potential troubles caused by the drainage water during stop of the vehicle or by the vapor discharged together with the drainage water.

B. Second Embodiment

Figure 7:
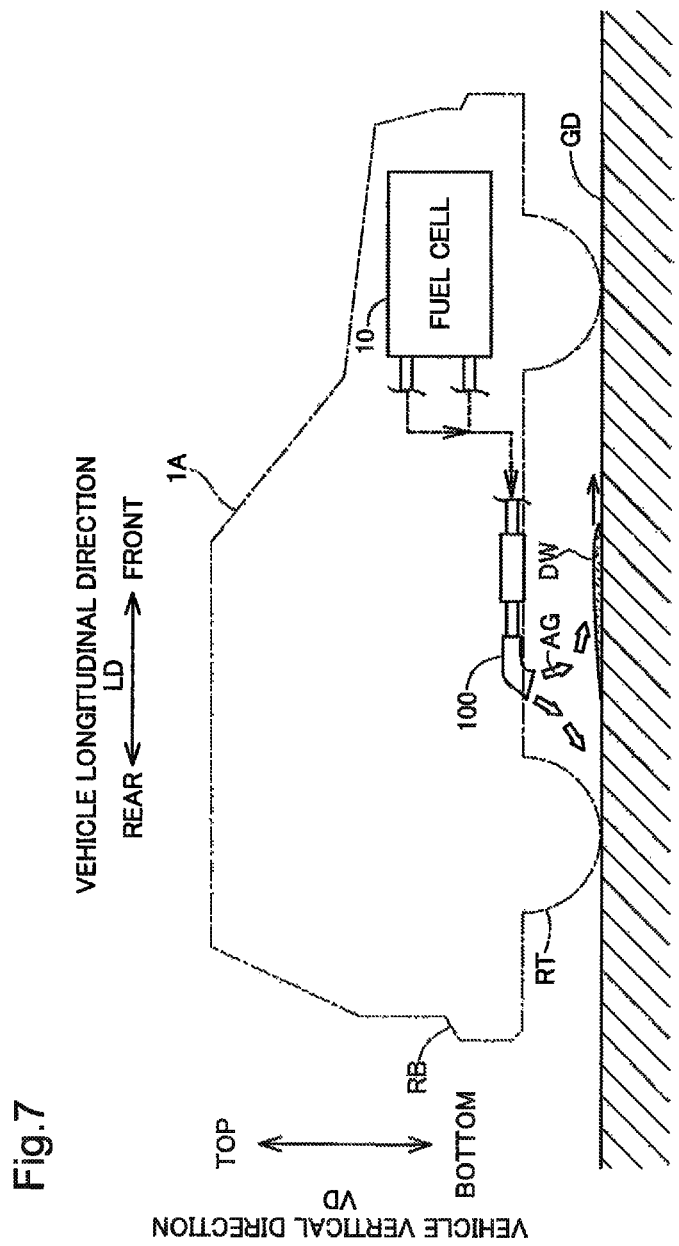
FIG. 7 is a schematic diagram illustrating the configuration of a fuel cell vehicle according to a second embodiment.

FIG. 7 is a schematic diagram illustrating the configuration of a fuel cell vehicle 1A according to a second embodiment of the invention. FIG. 7 illustrates the fuel cell vehicle 1A like FIG. 1 and additionally illustrates a puddle formed by drainage water DW and arrows AG indicating the flow of exhaust gas. The fuel cell vehicle 1A of the second embodiment has similar configuration to that of the fuel cell vehicle 1 of the first embodiment, except the different mounting position of an exhaust pipe 100. The exhaust pipe 100 has configuration similar to the configuration described in the first embodiment with referring FIG. 2.

In the fuel cell vehicle 1A of the second embodiment, the exhaust pipe 100 is mounted in a location that is in a rear portion of the fuel cell vehicle 1A but is ahead of the rear wheels RT. This configuration more effectively suppresses the drainage water DW discharged from the exhaust pipe 100 from splashing rearward of the fuel cell vehicle 1A. Additionally, the puddle by the drainage water DW is formed in a location deep below the fuel cell vehicle 1A. This more effectively suppresses the potential troubles caused by the puddle.

C. Third Embodiment

Figure 8:
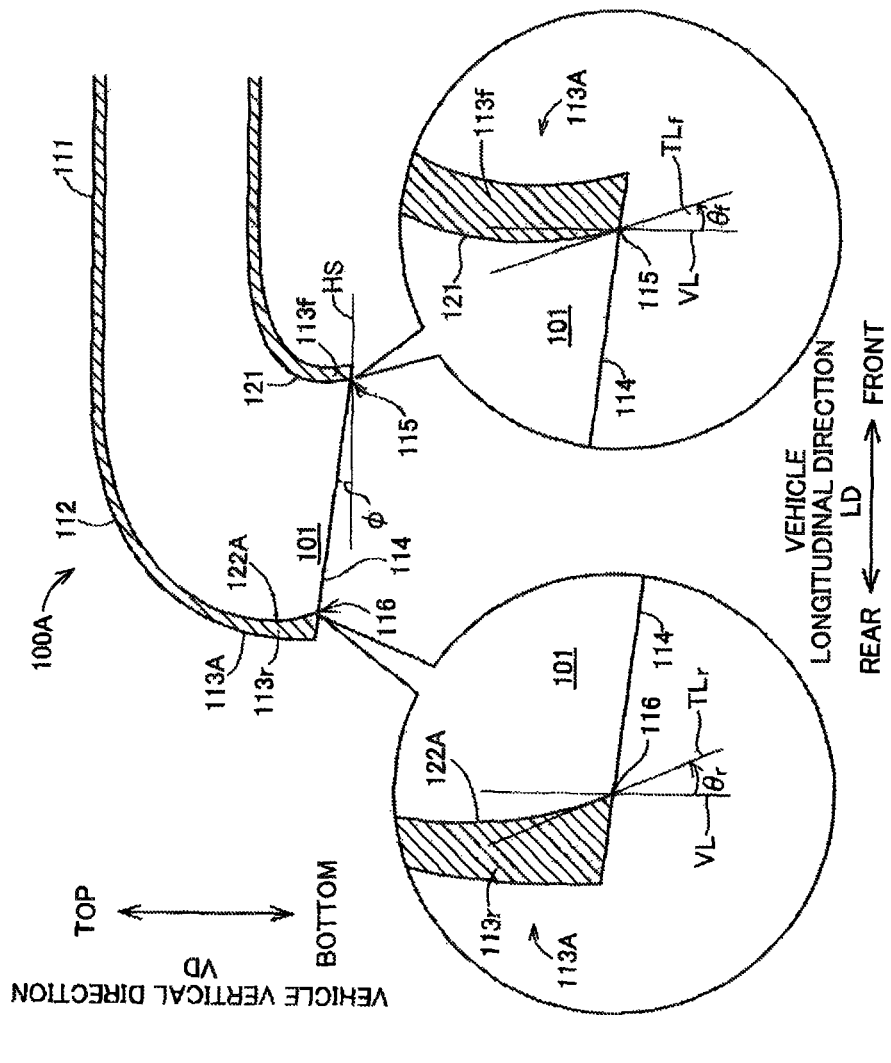
FIG. 8 is a schematic sectional view illustrating the configuration of an exhaust pipe according to a third embodiment.

FIG. 8 is a schematic sectional view illustrating the configuration of an exhaust pipe 100A used in a fuel cell vehicle according to a third embodiment of the invention. FIG. 8 is substantially similar to FIG. 2, except the different configuration of a second wall portion 113r on the curve outer circumference in an opening end portion 113A. The fuel cell vehicle of the third embodiment has configuration substantially similar to the configuration of the fuel cell vehicle 1 of the first embodiment which is shown in FIG. 1, except that the fuel cell vehicle of the third embodiment includes the exhaust pipe 100A shown in FIG. 8 in place of the exhaust pipe 100.

In the exhaust pipe 100A of the third embodiment, an inner wall surface 122A of the second wall portion 113r on the curve outer circumference in the opening end portion 113A is curved toward the extended portion 111 (toward the upstream side of the curved portion 112), i.e., curved to be convex rearward, like the inner wall surface 121 of the first wall portion 113f on the curve inner circumference. In the state that the exhaust pipe 100A is mounted to the fuel cell vehicle, the inner wall surface 122A of the second wall portion 113r on the curve outer circumference is accordingly inclined from the rear side toward the front side of the vehicle. In the section of FIG. 8, a tangent $TL_r$ at an end 116 of the inner wall surface 122A of the second wall portion 113r has an angle of inclination $\theta_r$ ($\theta_r > 0°$) forward of the vehicle relative to a straight line VL parallel to the vehicle vertical direction.

This configuration defines the flow direction of the exhaust gas discharged from the exhaust pipe 100A of the third embodiment to the direction from the rear side toward the front side of the fuel cell vehicle. Accordingly, the drainage water DW discharged from the exhaust pipe 100A is guided forward of the fuel cell vehicle by the flow of the exhaust gas. This configuration suppresses splashes of the drainage water rearward of the fuel cell vehicle and suppresses the spread and move of a puddle formed by the drainage water DW rearward of the fuel cell vehicle.

D. Fourth Embodiment

Figure 9:
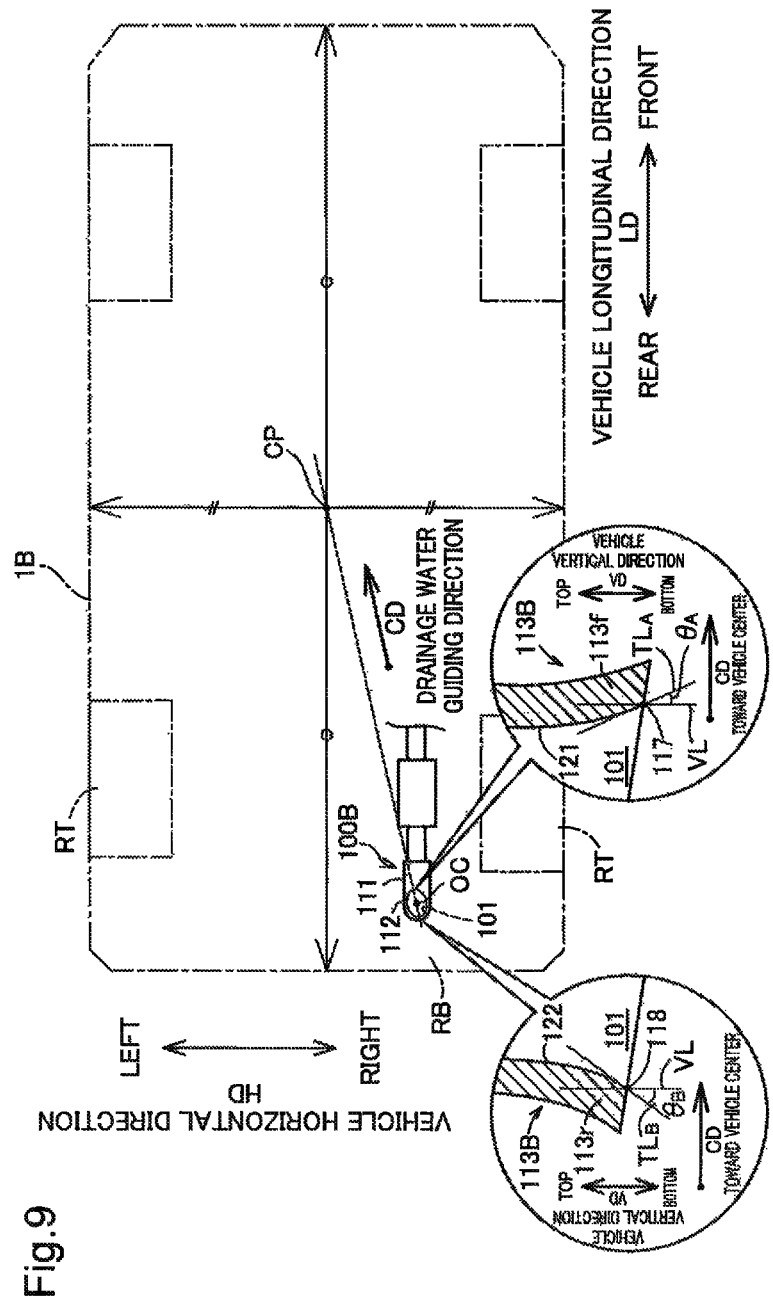
FIG. 9 is a schematic diagram illustrating the configuration of a fuel cell vehicle according to a fourth embodiment.

FIG. 9 is a schematic diagram illustrating the configuration of a fuel cell vehicle 1B according to a fourth embodiment of the invention. FIG. 9 illustrates the outline of the fuel cell vehicle 1B and the positions of wheels viewed along the vehicle vertical direction by the one-dot chain line and also illustrates the mounting position of an exhaust pipe 100B of the fourth embodiment by the solid line. FIG. 9 illustrates an arrow HD indicating a horizontal direction of the fuel cell vehicle 1B, hereinafter also called "vehicle horizontal direction", in addition to the arrow LD indicating the vehicle longitudinal direction. The vehicle horizontal direction corresponds to the lateral direction of the fuel cell vehicle 1B and is orthogonal to the vehicle longitudinal direction and the vehicle vertical direction.

A point that is the center in the vehicle longitudinal direction and is also the center in the vehicle horizontal direction of the fuel cell vehicle 1B is called "vehicle center point CP". FIG. 9 also illustrates a broken line connecting the vehicle center point CP with a center OC of an opening 101 of the exhaust pipe 100B and an arrow CD indicating a direction from the center OC toward the vehicle center point CP, hereinafter also called "drainage water guiding direction".

The exhaust pipe 100B of the fourth embodiment is mounted to the fuel cell vehicle 1B in a similar location to that of the exhaust pipe 100 of the first embodiment. The exhaust pipe 100B is mounted to the fuel cell vehicle 1B such that its opening is open downward from the bottom face of a rear bumper RB at a location behind the rear wheels RT. The exhaust pipe 100B of the fourth embodiment is mounted in a location deviated from the center in the vehicle horizontal direction.

The exhaust pipe 100B of the fourth embodiment has configuration similar to the configuration of the exhaust pipe 100 of the first embodiment, except the different configuration of a wall portion of an opening end portion 113B. In the exhaust pipe 100B of the fourth embodiment, a first wall portion 113f on the curve inner circumference of the opening end portion 113B is curved in the drainage water guiding direction, while a second wall portion 113r on the curve outer circumference is curved in its opposite direction. Accordingly the opening 101 is formed in an approximately elliptical shape having its longitudinal axis that is substantially identical with the drainage water guiding direction.

In the exhaust pipe 100B of the fourth embodiment, the first wall portion 113f and the second wall portion 113r of the opening end portion 113B have the following configuration in a plane of section that includes the vehicle center point CP and the center OC of the opening 101 and is parallel to the vehicle vertical direction. In this plane of section, a tangent $TL_A$ at an end 117 of an inner wall surface 121 of a first wall portion 113f on the curve inner circumference has an angle $\theta_A$ ($\theta_A$>0°) in the direction toward the vehicle center relative to a straight line VL parallel to the vehicle vertical direction. In this plane of section, a tangent $TL_B$ at an end 118 of an inner wall surface 122 of a second wall portion 113r has an angle $\theta_B$ ($\theta_B$>0°) in the direction toward the vehicle center relative to the straight line VL parallel to the vehicle vertical direction.

The exhaust pipe 100B of the fourth embodiment having this configuration guides the drainage water in the drainage water guiding direction toward the vehicle center point CP, while guiding the vapor discharged together with the drainage water in its opposite direction. Accordingly, the configuration of the fuel cell vehicle 1B including the exhaust pipe 100B of the fourth embodiment more effectively suppresses the potential troubles caused by drainage water during stop of the vehicle.

E. Fifth Embodiment

Figure 10:
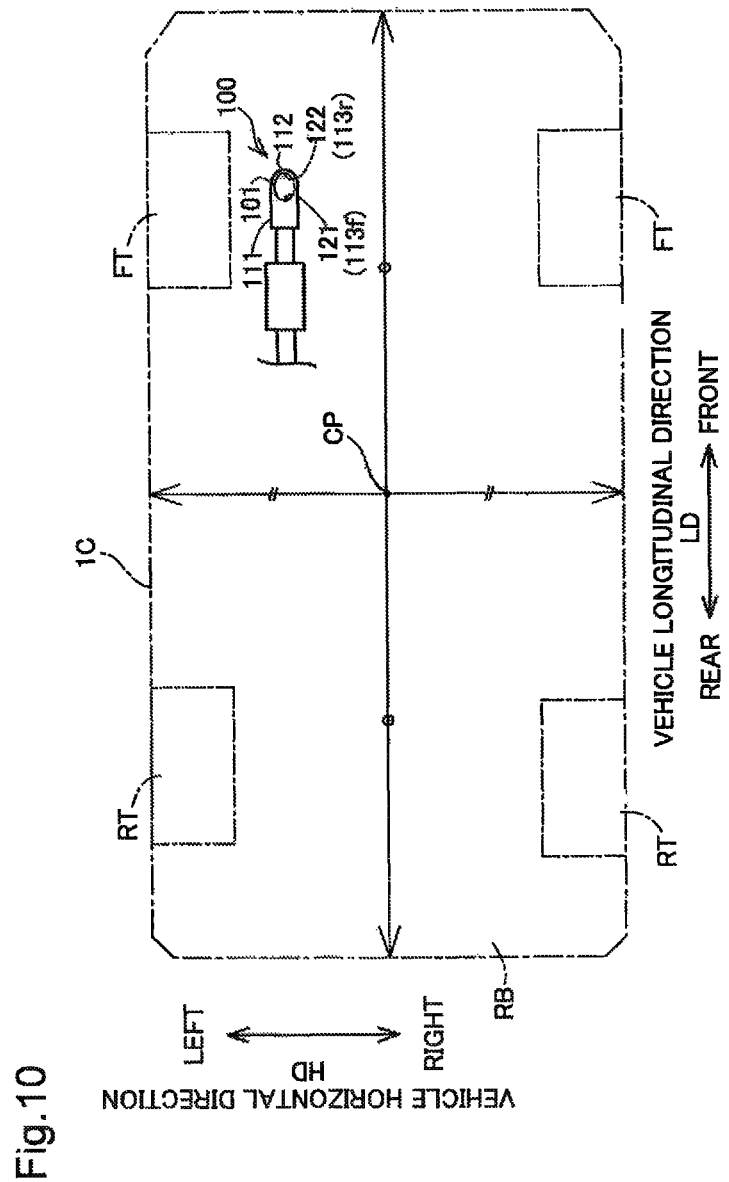
FIG. 10 is a schematic diagram illustrating the configuration of a fuel cell vehicle according to a fifth embodiment.

FIG. 10 is a schematic diagram illustrating the configuration of a fuel cell vehicle 1C according to a fifth embodiment of the invention. FIG. 10 illustrates the outline of the fuel cell vehicle 1C viewed along the vehicle vertical direction by the one-dot chain line and also illustrates an exhaust pipe 100 by the solid line. FIG. 10 also illustrates the vehicle center point CP like FIG. 9.

The fuel cell vehicle 1C of the fifth embodiment has configuration substantially similar to the configuration of the fuel cell vehicle 1 of the first embodiment, except the different mounting position and the different mounting direction of an exhaust pipe 100. The exhaust pipe 100 has configuration similar to the configuration described in the first embodiment and includes first and second wall portions 113f and 113r that are formed to increase the distance therebetween downward as shown in FIG. 2.

In the fuel cell vehicle 1C of the fifth embodiment, the exhaust pipe 100 is mounted in a location ahead of the vehicle center point CP in a direction such that the vehicle rear side is the upstream side and the vehicle front side is the downstream side. Accordingly, in the fuel cell vehicle 1C of the fifth embodiment, an inner wall surface 121 of the first wall portion 113f of the exhaust pipe 100 is inclined downward toward the rear side of the vehicle, while an inner wall surface 122 of the second wall portion 113r is inclined downward toward the front side of the vehicle.

In the fuel cell vehicle 1C of the fifth embodiment, the drainage water discharged from the exhaust pipe 100 is guided toward the vehicle center below the vehicle. This configuration suppresses the drainage water discharged from the exhaust pipe 100 from splashing forward of the vehicle and suppresses a puddle of the drainage water from being spread out of the underneath area of the fuel cell vehicle 1C. In the fuel cell vehicle 1C of the fifth embodiment, placing the exhaust pipe 100 ahead of front wheels FT suppresses accumulation of the vapor on brake pads of the front wheels FT.

F. Sixth Embodiment

Figure 11:
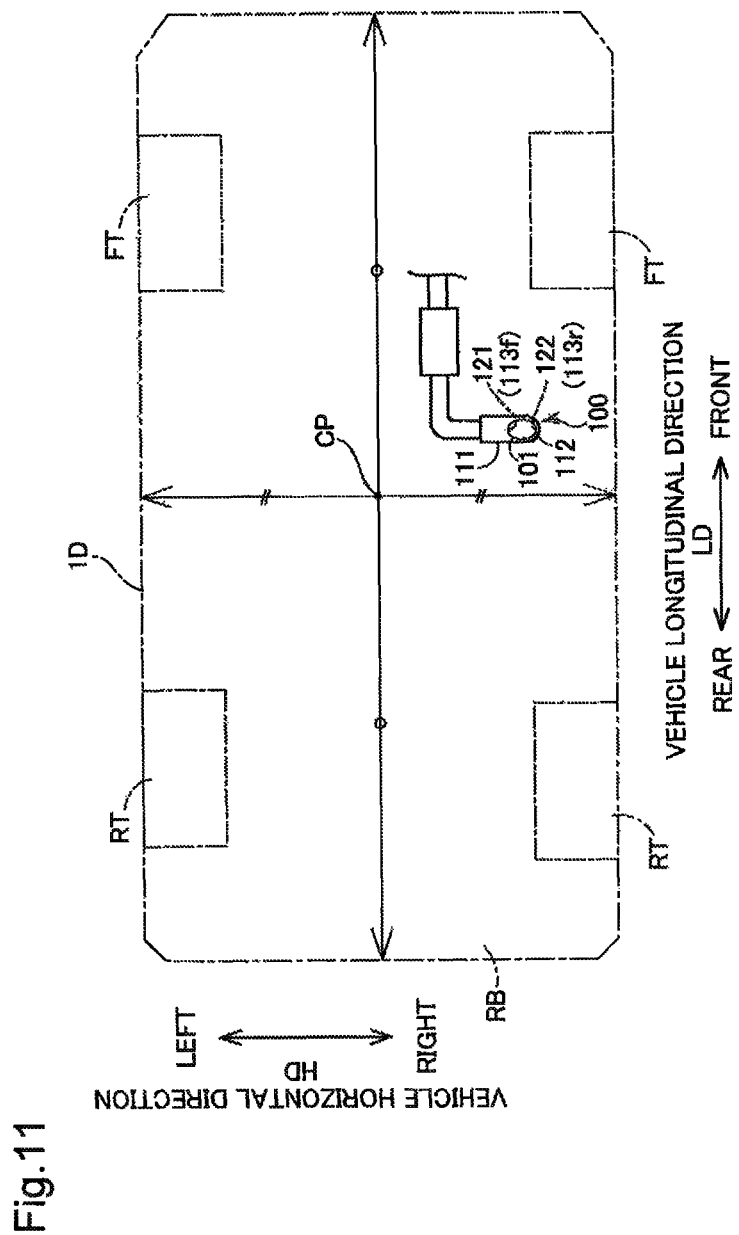
FIG. 11 is a schematic diagram illustrating the configuration of a fuel cell vehicle according to a sixth embodiment.

FIG. 11 is a schematic diagram illustrating the configuration of a fuel cell vehicle 1D according to a sixth embodiment of the invention, like FIG. 10. The fuel cell vehicle 11 of the sixth embodiment has configuration substantially similar to the configuration of a fuel cell vehicle 1C of the fifth embodiment, except the different mounting position and the different mounting direction of an exhaust pipe 100.

In the fuel cell vehicle 1D of the sixth embodiment, the exhaust pipe 100 is mounted such that a first wall portion 113f is located on the vehicle center point CP-side in the vehicle horizontal direction and that a second wall portion 113r is located on the opposite side to the vehicle center point CP in the vehicle horizontal direction. This configuration causes the drainage water discharged from the exhaust pipe 100 to be guided toward the vehicle center point CP. This accordingly suppresses the drainage water from splashing sideward of the vehicle and suppresses a puddle of the drainage water from being spread out of the underneath area of the vehicle.

In the fuel cell vehicle 1D of the sixth embodiment, the mounting position of the exhaust pipe is not specifically limited in the vehicle longitudinal direction. It is preferable that the exhaust pipe 100 is mounted in a location deviated from the front wheels FT and the rear wheels RT in the vehicle longitudinal direction. This configuration suppresses the vapor discharged from the exhaust pipe 100 from being accumulated on the brake pads of the front wheels FT or the rear wheels RT.

G. Modifications

G1. Modification 1

In the respective embodiments described above, the exhaust pipe 100, 100A or 100B is mounted to the fuel cell vehicle. According to a modification, each of these exhaust pipes 100, 100A and 100B may be mounted to a moving body other than the fuel cell vehicle. More specifically, each of the exhaust pipes 100, 100A and 100B may be mounted to a moving body that is equipped with a fuel cell and moves along the ground (for example, hovercraft). According to another modification, each of the exhaust pipes 100, 100A and 100B may not be limited to the application to the moving body but may be used as an outlet for defining the moving direction of drainage water in a stationary fuel cell. For example, each of the exhaust pipes 100, 100A and 100B may be mounted to a stationary fuel cell to guide the drainage water toward a center location below a fuel cell body.

G2. Modification 2

In the embodiments described above, the exhaust pipe 100 is configured to discharge both the drainage water on the cathode 11-side and the drainage water on the anode 12-side of the fuel cell 10. According to a modification, the exhaust pipe 100 may be configured to discharge at least one of the drainage water on the cathode 11-side and the drainage water on the anode 12-side of the fuel cell 10.

G3. Modification 3

In the embodiments described above, the exhaust pipe 100, 100A or 100B is mounted to the fuel cell vehicle such that the extended portion 111 is arranged parallel to the vehicle longitudinal direction. According to a modification, the exhaust pipe 100, 100A or 100B may be mounted to the fuel cell vehicle such that the extended portion 111 is arranged in a direction intersecting the vehicle longitudinal direction. The requirement is that the exhaust pipe 100, 100A or 100B is arranged such that the upstream side of the curved portion 112 is located on the center side in the vehicle longitudinal direction or in the vehicle horizontal direction. According to a modification, the extended portion 111 may be arranged to have an angle of inclination in the vertical direction or in the horizontal direction relative to the vehicle longitudinal direction.

G4. Modification 4

In each of the embodiments described above, each of the inner wall surfaces 121 and 122 of the first and the second wall portions 113f and 113r of the opening end portion 113 are formed to be curved forward of the vehicle or rearward of the vehicle. According to a modification, each of the inner wall surfaces 121 and 122 may be formed not to be curved forward of the vehicle or rearward of the vehicle but to be extended linearly.

G5. Modification 5

In each of the embodiments described above, the opening end face 114 of the exhaust pipe 100, 100A or 100B is formed to face rearward of the vehicle. According to a modification, the opening end face 114 of each of the exhaust pipes 100, 100A and 100B may be formed parallel to the vehicle longitudinal direction. According to another modification, the opening end face 114 of each of the exhaust pipes 100, 100A and 100B may be formed to face forward of the vehicle or may be formed to face sideward of the vehicle.

G6. Modification 6

In the embodiments described above, the exhaust pipe 100, 100A or 100B is mounted to the fuel cell vehicle in a fixed manner. According to a modification, each of the exhaust pipes 100, 100A and 100B may be mounted to the fuel cell vehicle such that the mounting angle is freely changeable. More specifically, each of the exhaust pipes 100, 100A and 100B may be mounted such that the mounting angle is changed by using a flexible piping joint bent by a driving mechanism such as an actuator as a joint portion. The requirement is that each of the exhaust pipes 100, 100A or 100B is mounted in the state described above in each of the embodiments at least in the course of water drainage during stop of the fuel cell vehicle.

G7. Modification 7

In the fourth to the sixth embodiments described above, the inner wall surface on the curve outer circumference of the curved portion 112 in the opening end portion 113 or 113B of the exhaust pipe 100 or 100B is formed to be inclined downward in the direction opposite to the upstream side of the curved portion 112. According to a modification, the inner wall surface on the curve outer circumference of the curved portion 112 in the opening end portion 113 or 113B of the exhaust pipe 100 or 100B may be formed to be inclined downward in the direction toward the upstream side of the curved portion 112.

The invention is not limited to any of the embodiments, the examples and the modifications described above but may be implemented by a diversity of other configurations without departing from the scope of the invention. For example, the technical features of any of the embodiments, examples and modifications corresponding to the technical features of each of the aspects described in Summary may be replaced or combined appropriately; in order to solve part or all of the problems described above or in order to achieve part or all of the advantageous effects described above. Any of the technical features may be omitted appropriately unless the technical feature is described as essential herein.

REFERENCE SIGNS LIST

1, 1A, 1B, 1a fuel cell vehicle
2 fuel cell system
10 fuel cell
11 cathode
12 anode
20 cathode gas supply system
21 cathode gas piping
23 air compressor
25 on-off valve
30 anode gas supply system
31 hydrogen tank
33 anode gas piping
35 regulator
37 on-off valve
39 hydrogen supply drive
40 exhaust drainage treatment system
41 cathode system
411 cathode off gas pipe
412 pressure regulator
42 anode system
421 anode off gas pipe
422 pressure regulator
423 gas liquid separator
424 drainage pipe
425 drainage valve
426 hydrogen circulation pipe
427 hydrogen circulation pump
43 joint discharge portion
431 junction pipe
432 muffler
100, 100A, 100B, 100a exhaust pipe
101 opening
111 extended portion
112 curved portion
113, 113A, 113B, 113a opening end portion
113f first wall portion
113r second wall portion
114 opening end face
121, 122, 122A inner wall surface
115, 116, 117, 118 end
DW drainage water
GD ground
RB rear bumper
RT rear wheel
ST vapor

The invention claimed is:

1. A piping member mounted to a moving body equipped with a fuel cell, wherein the piping member is configured to discharge exhaust gas and drainage water of the fuel cell together at once, the piping member comprising:

an extended portion that is extended approximately linearly and is mounted to the moving body such that the extended portion is parallel to a plane parallel to a longitudinal direction of the moving body and a lateral direction of the moving body, a curved pipe portion that is curved from the extended portion toward an opening end portion including an opening and is placed on the moving body such that an upstream side of the curved pipe portion is located on a center of the moving body in the longitudinal direction of the moving body or in the lateral direction of the moving body, wherein the opening end portion has an opening end face in which the opening is formed, the curved pipe portion is connected to the extended portion so that an angle against the extended portion is fixed, the curved pipe portion is attached to the moving body such that the opening end face is inclined against the plane and the opening opens downward of the moving body, and an inner wall surface located on a curve inner circumference side of the curved pipe portion out of an inner wall surface around the opening is inclined downward in a direction toward the upstream side of the curved pipe portion.

2. The piping member according to claim 1, wherein the opening end portion is placed on a rear side of a center in the longitudinal direction of the moving body, the curved pipe portion is placed on the moving body such that the upstream side thereof is located on the center in the longitudinal direction of the moving body, and the inner wall surface located on the curve inner circumference side of the curved pipe portion out of the inner wall surface around the opening is inclined downward in a direction from a rear side toward a front side of the moving body.

3. The piping member according to claim 2, wherein the inner wall surface located on the curve inner circumference side of the curved pipe portion out of the inner wall surface around the opening is a first inner wall surface located on the front side of the moving body, and the opening end portion has a second inner wall surface that is located on the rear side of the moving body and that is inclined downward in a direction from the front side toward the rear side of the moving body.

4. The piping member according to claim 2, wherein the inner wall surface located on the curve inner circumference side of the curved pipe portion out of the inner wall surface around the opening is a first inner wall surface located on the front side of the moving body, and the opening end portion has a second inner wall surface that is located on the rear side of the moving body and that is inclined downward in the direction from the rear side toward the front side of the moving body.

5. The piping member according to claim 2, wherein the opening end face is inclined rearward of the moving body in a state that the piping member is mounted to the moving body.

6. A fuel cell vehicle comprising:

a fuel cell; and a piping member according to claim 1, wherein the moving body is the fuel cell vehicle.

* * * * *